United States Patent
Khanagha

(10) Patent No.: US 12,100,417 B2
(45) Date of Patent: Sep. 24, 2024

(54) SYSTEMS AND METHODS FOR DETECTING EMOTION FROM AUDIO FILES

(71) Applicant: Capital One Services, LLC, McLean, VA (US)

(72) Inventor: Vahid Khanagha, Rockville, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 23 days.

(21) Appl. No.: 17/468,568

(22) Filed: Sep. 7, 2021

(65) Prior Publication Data

US 2023/0076242 A1 Mar. 9, 2023

(51) Int. Cl.
*G10L 25/63* (2013.01)
*G06F 16/65* (2019.01)
(Continued)

(52) U.S. Cl.
CPC .............. *G10L 25/63* (2013.01); *G06F 16/65* (2019.01); *G06N 3/04* (2013.01); *G10L 15/187* (2013.01)

(58) Field of Classification Search
CPC ....... G10L 25/63; G10L 15/187; G06F 16/65; G06N 3/04
See application file for complete search history.

(56) References Cited

U.S. PATENT DOCUMENTS

| 7,222,075 B2 * | 5/2007 | Petrushin | ................ G10L 17/26 |
| | | | 379/88.01 |
| 7,940,914 B2 | 5/2011 | Petrushin | |
| 10,805,464 B2 | 10/2020 | Zimmerman | |
| 11,417,337 B1 * | 8/2022 | Shi | ........................ G10L 15/16 |
| 11,451,666 B1 * | 9/2022 | Biswas | ................... G06F 40/35 |
| 2007/0067159 A1 * | 3/2007 | Basu | .................... H04M 3/2281 |
| | | | 704/200 |

(Continued)

FOREIGN PATENT DOCUMENTS

| CN | 108154879 B | 4/2021 |
| IN | 201304854 | 5/2015 |
| KR | 102106700 B1 | 5/2020 |

OTHER PUBLICATIONS

Atassi, Hicham, et al. "Automatic identification of successful phone calls in call centers based on dialogue analysis." 2014 5th IEEE Conference on Cognitive Infocommunications (CogInfoCom). IEEE, 2014, pp. 425-429 (Year: 2014).*

(Continued)

*Primary Examiner* — Jesse S Pullias
*Assistant Examiner* — Michael C. Lee
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system that may receive an audio file comprising an interaction between a first user and a second user. The system may detect, using a deep neural network (DNN), moment(s) of interruption between the first and second users from the audio file. The system may extract, using the DNN, vocal feature(s) from the moment(s) of interruption. The system may determine, using a machine learning model (MLM) and based on the vocal feature(s), whether a threshold number of moments of the moment(s) of interruption corresponds to a first emotion type. When the threshold number of moments corresponds to the first emotion type, the system may transmit a first message comprising a first binary indication. When the threshold number of moments do not correspond to the first emotion type, the system may transmit a second message comprising a second binary indication.

20 Claims, 5 Drawing Sheets

(51) Int. Cl.
  *G06N 3/04* (2023.01)
  *G10L 15/187* (2013.01)

(56) References Cited

U.S. PATENT DOCUMENTS

| | | | | |
|---|---|---|---|---|
| 2010/0332287 | A1* | 12/2010 | Gates | G06Q 30/02 379/265.09 |
| 2011/0206198 | A1* | 8/2011 | Freedman | H04M 3/51 379/265.03 |
| 2012/0296642 | A1* | 11/2012 | Shammass | G10L 25/63 704/211 |
| 2016/0118050 | A1* | 4/2016 | Arslan | G10L 17/26 704/235 |
| 2017/0263245 | A1* | 9/2017 | Mizumoto | G10L 15/1815 |
| 2019/0253558 | A1* | 8/2019 | Haukioja | G10L 15/22 |
| 2021/0029248 | A1* | 1/2021 | Scodary | G06F 18/24155 |
| 2021/0157834 | A1* | 5/2021 | Sivasubramanian | G06F 16/686 |
| 2022/0005494 | A1* | 1/2022 | Berisha | A61B 5/7264 |
| 2022/0093101 | A1* | 3/2022 | Krishnan | G06V 10/40 |
| 2023/0007063 | A1* | 1/2023 | Gupta | H04L 12/1831 |

OTHER PUBLICATIONS

Chowdhury, Shammur Absar, et al. "Annotating and categorizing competition in overlap speech." 2015 IEEE International Conference on Acoustics, Speech and Signal Processing (ICASSP). IEEE, 2015, pp. 5316-5320 (Year: 2015).*
Cong, Pengyu, et al. "Unsatisfied customer call detection with deep learning." 2016 10th International Symposium on Chinese Spoken Language Processing (ISCSLP). IEEE, 2016, pp. 1-5 (Year: 2016).*
Chowdhury, Shammur Absar, et al. "Automatic classification of speech overlaps: feature representation and algorithms." Computer Speech & Language 55 (2019): pp. 145-167 (Year: 2019).*
Definition of "Decibel", Merriam-Webster dictionary, available at https://web.archive.org/web/20210304223924/https://www.merriam-webster.com/dictionary/decibel (archived on Mar. 4, 2021) (Year: 2021).*
Interactive International Phonetic Alphabet Chart, available at https://web.archive.org/web/20210817140011/https://www.ipachart.com/ (archived Aug. 17, 2021) (Year: 2021).*
Caraty, Marie-José, et al. "Detecting speech interruptions for automatic conflict detection." Conflict and Multimodal Communication: Social Research and Machine Intelligence (2015), pp. 377-401. (Year: 2015).*
Siegert, Ingo, et al. "Overlapping speech, utterance duration and affective content in HHI and HCI—An comparison." 2015 6th IEEE International Conference on Cognitive Infocommunications (CogInfoCom). IEEE, 2015, pp. 83-88. (Year: 2015).*
Rajan, Vandana, et al. "ConflictNET: End-to-end learning for speech-based conflict intensity estimation." IEEE Signal Processing Letters 26.11 (2019), pp. 1668-1672. (Year: 2019).*
Translation of Indian Patent Publication No. 201304854, Samsung R&D Institute India Bangalore, Published May 8, 2015.

* cited by examiner

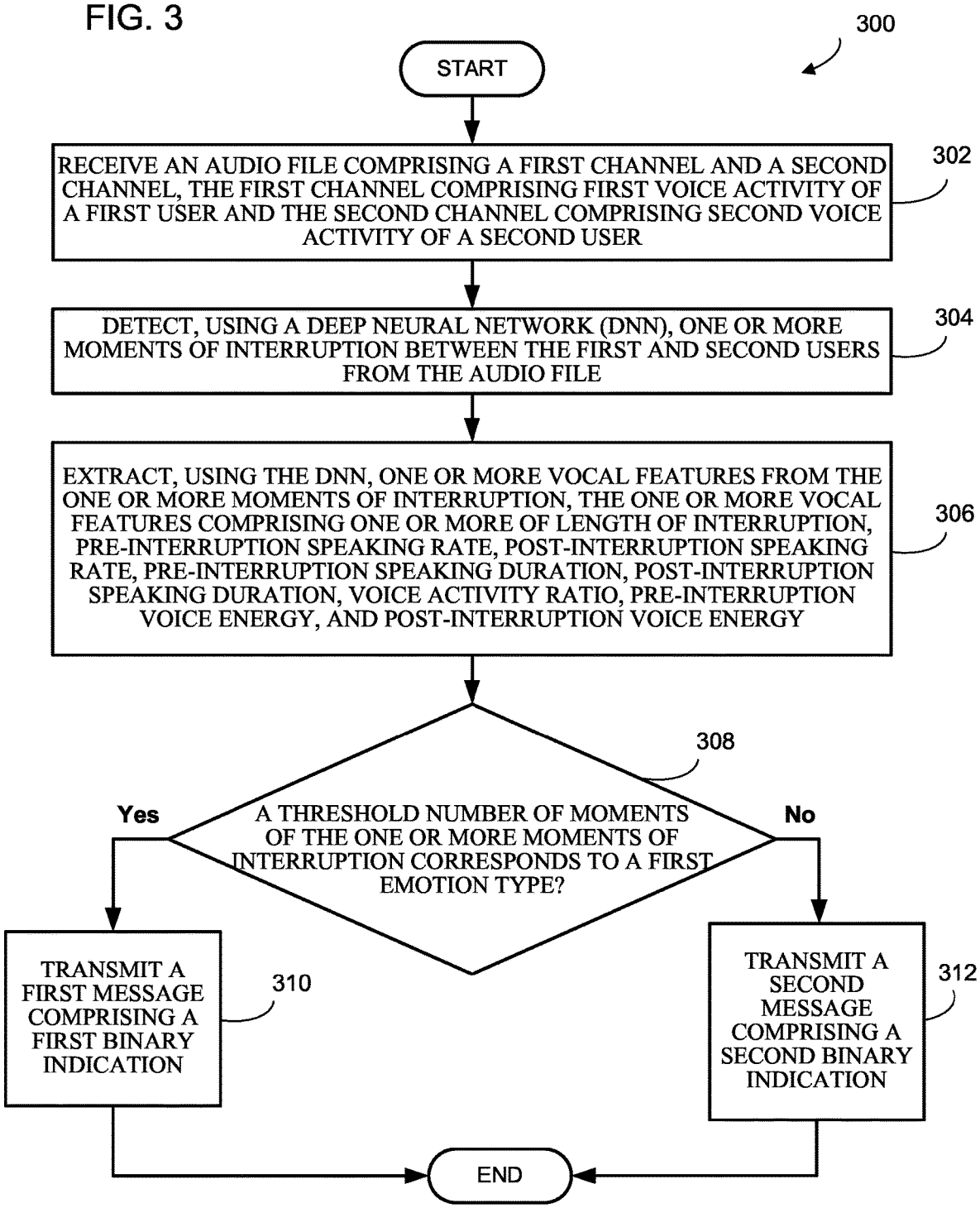

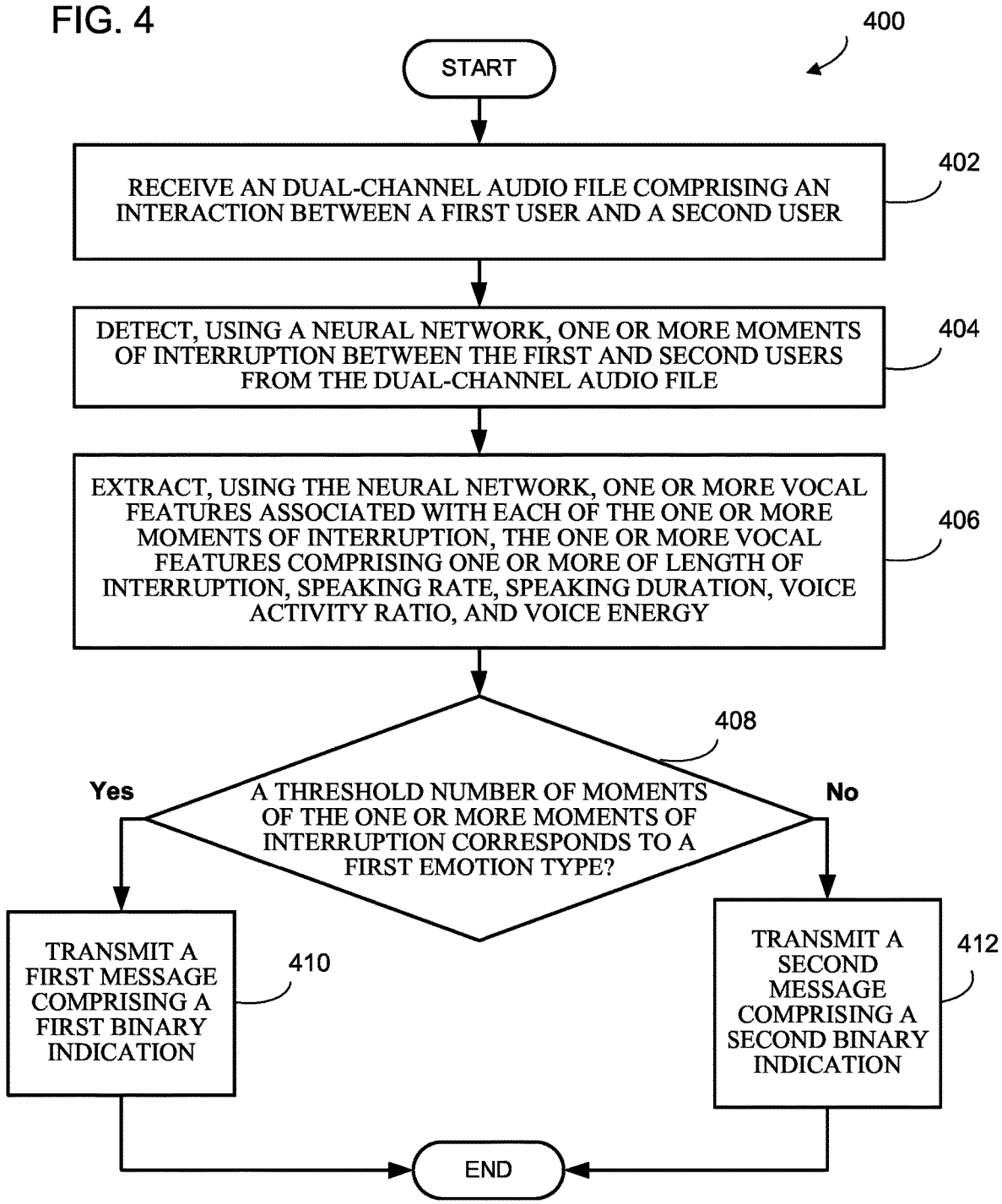

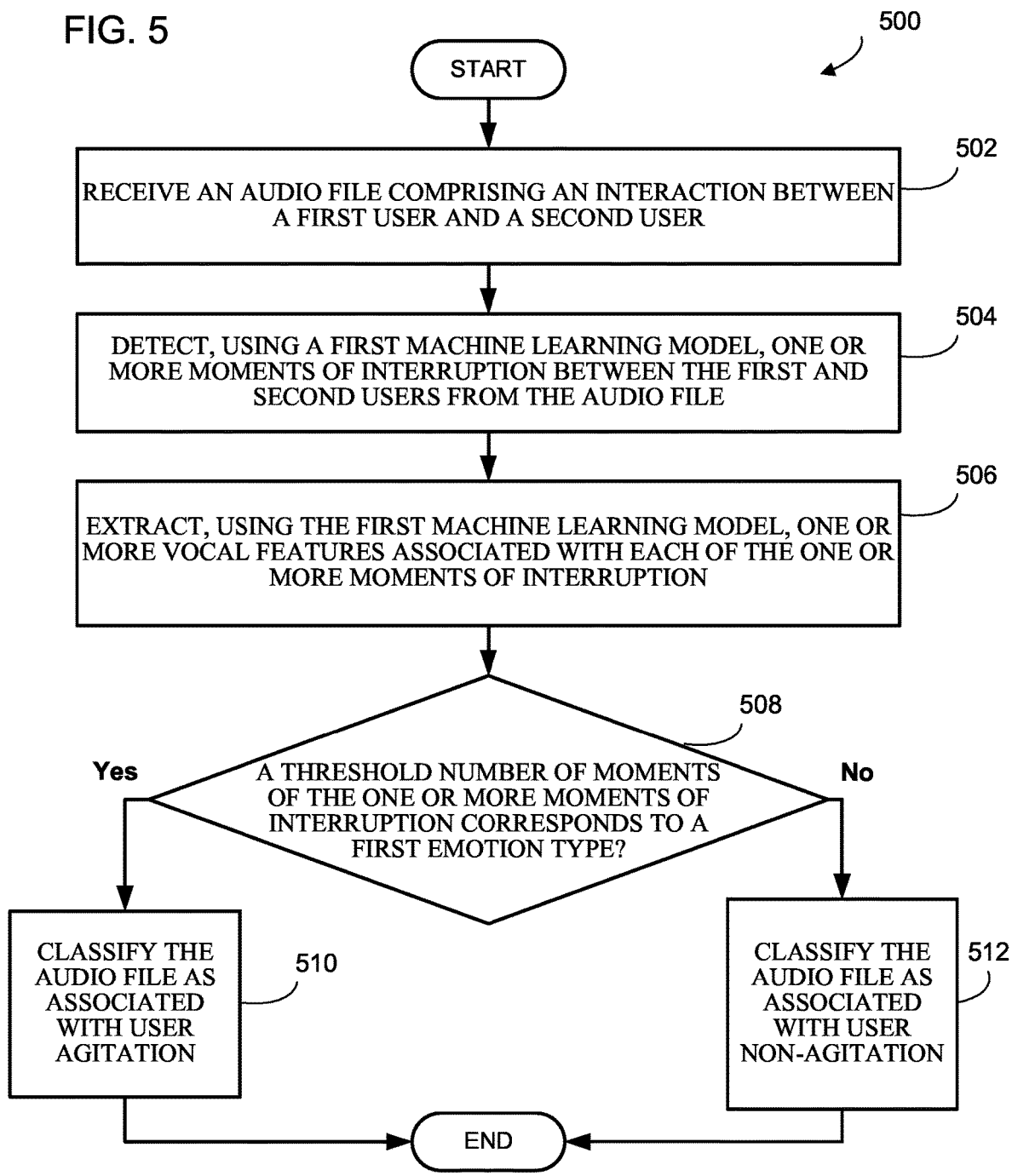

SYSTEMS AND METHODS FOR DETECTING EMOTION FROM AUDIO FILES

FIELD

The disclosed technology relates to systems and methods for detecting emotion from audio files. In particular, the disclosed technology relates to systems and methods for identifying customer emotion by detecting moments of interruption within dual-channel audio files.

BACKGROUND

Speech emotion recognition (SER) involves the identification of human emotion based on information carried in the human voice. Organizations may rely on SER in order to better understand their customer base. For example, many organizations provide call centers to assist customers with issues with products, services, payments, etc. Call center representatives must learn how to best interact with customers and provide customers with helpful and efficient solutions to their issues. Organizations may therefore utilize SER for purposes of coaching employees how to handle various customer interactions.

Traditional systems and methods for SER typically involve a combination of low level descriptors (LLD), i.e., prosodic, spectral, and voice quality features (e.g., pitch, energy, formant structure, etc.) and high level descriptors (HLD), i.e., statistics of LLDs (e.g., mean, maximum, minimum, variance, etc.) extracted from single channel audio files via conventional machine learning models. These traditional systems and methods usually result in low accuracy because of extreme vocal feature variability among people, e.g., based on cultural differences, and inconsistencies in how different channels of communication (e.g., microphones, smartphones, etc.) pick up on vocal characteristics. Modern data-driven approaches, such as deep neural network (DNN) based approaches, are able to capture these variabilities to some extent, but they require enormous sets of in-domain data for model training.

Accordingly, there is a need for improved systems and methods for conducting SER. Embodiments of the present disclosure are directed to this and other considerations.

SUMMARY

Disclosed embodiments may include a system for detecting emotion from audio files. The system may include one or more processors, and memory in communication with the one or more processors and storing first instructions that are configured to cause the system to perform a method for detecting customer emotion based on detected moments of interruption in audio files. The system may receive an audio file comprising a first channel and a second channel, the first channel comprising first voice activity of a first user and the second channel comprising second voice activity of a second user. The system may detect, using a DNN, one or more moments of interruption between the first and second users from the audio file. The system may extract, using the DNN, one or more vocal features from the one or more moments of interruption, the one or more vocal features comprising one or more of length of interruption (i.e., an overtalking period between the first and second users), pre-interruption speaking rate, post-interruption speaking rate, pre-interruption speaking duration, post-interruption speaking duration, voice activity ratio, pre-interruption voice energy, and post-interruption voice energy. The system may determine, using a machine learning model (MLM) and based on the one or more vocal features, whether a threshold number of moments of the one or more moments of interruption corresponds to a first emotion type. When the threshold number of moments corresponds to the first emotion type, the system may transmit a first message comprising a first binary indication. When the threshold number of moments do not correspond to the first emotion type, the system may transmit a second message comprising a second binary indication.

In another embodiment, the system may include one or more processors, and memory in communication with the one or more processors and storing first instructions that are configured to cause the system to perform a method for detecting customer emotion based on detected moments of interruption in audio files. The system may receive a dual-channel audio file comprising an interaction between a first user and a second user. The system may detect, using a neural network (NN), one or more moments of interruption between the first and second users from the dual-channel audio file. The system may extract, using the NN, one or more vocal features associated with each of the one or more moments of interruption, the one or more vocal features comprising one or more of length of interruption, speaking rate, speaking duration, voice activity ratio, and voice energy. The system may determine, using an MLM and based on the one or more vocal features, whether a threshold number of moments of the one or more moments of interruption corresponds to a first emotion type. When the threshold number of moments corresponds to the first emotion type, the system may transmit a first message comprising a first binary indication. When the threshold number of moments do not correspond to the first emotion type, the system may transmit a second message comprising a second binary indication.

In another embodiment, the system may include one or more processors, and memory in communication with the one or more processors and storing first instructions that are configured to cause the system to perform a method for detecting customer emotion based on detected moments of interruption in audio files. The system may receive an audio file comprising an interaction between a first user and a second user. The system may detect, using a first MLM, one or more moments of interruption between the first and second users from the audio file. The system may extract, using the first MLM, one or more vocal features associated with each of the one or more moments of interruption. The system may determine, using a second MLM and based on the one or more vocal features, whether a threshold number of moments of the one or more moments of interruption corresponds to a first emotion type. When the threshold number of moments corresponds to the first emotion type, the system may classify the audio file as associated with user agitation. When the threshold number of moments do not correspond to the first emotion type, the system may classify the audio file as associated with user non-agitation.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIG. 3 is a flow diagram illustrating an exemplary method for detecting emotion from audio files, in accordance with certain embodiments of the disclosed technology.

FIG. 4 is a flow diagram illustrating an exemplary method for detecting emotion from audio files, in accordance with certain embodiments of the disclosed technology.

FIG. 5 is a flow diagram an illustrating an exemplary method for detecting emotion from audio files, in accordance with certain embodiments of the disclosed technology.

DETAILED DESCRIPTION

Examples of the present disclosure relate to systems and methods for detecting emotion from audio files. In particular, the disclosed technology relates to systems and methods for identifying customer emotion by detecting moments of interruption between two interactive audio channels, extracting one or more vocal features from each moment of interruption, determining whether each extracted vocal feature exceeds its own respective predetermined threshold, and based on that determination, determining whether each of the detected moments of interruption corresponds to a first emotion type, for example, agitation. The systems and methods described herein are necessarily rooted in computer and technology as they utilize MLMs to detect moments of interruption by identifying portions of audio files where a first channel, associated with a first user, and a second channel, associated with a second user, overlap. The systems and methods utilize additional MLMs to extract vocal features (e.g., length of interruption, speaking rates, speaking durations, voice activity ratios, voice energy, etc.) from the moments of interruption to determine whether each moment of interruption corresponds to a certain emotion type. Machine learning models are a unique computer technology that involves training the models to complete tasks, such as labeling, categorizing, identifying, or determining whether a user's vocal features (e.g., length of interruption, speaking rate, etc.) exceed respective predetermined thresholds so the MLMs learn how to label, categorize, identify, or determine whether moments of interruption correspond to certain customer emotions (e.g., agitation). Importantly, examples of the present disclosure improve the speed with which computers can determine customer emotion, by reducing the amount of data necessary to properly train the MLMs to make such determinations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
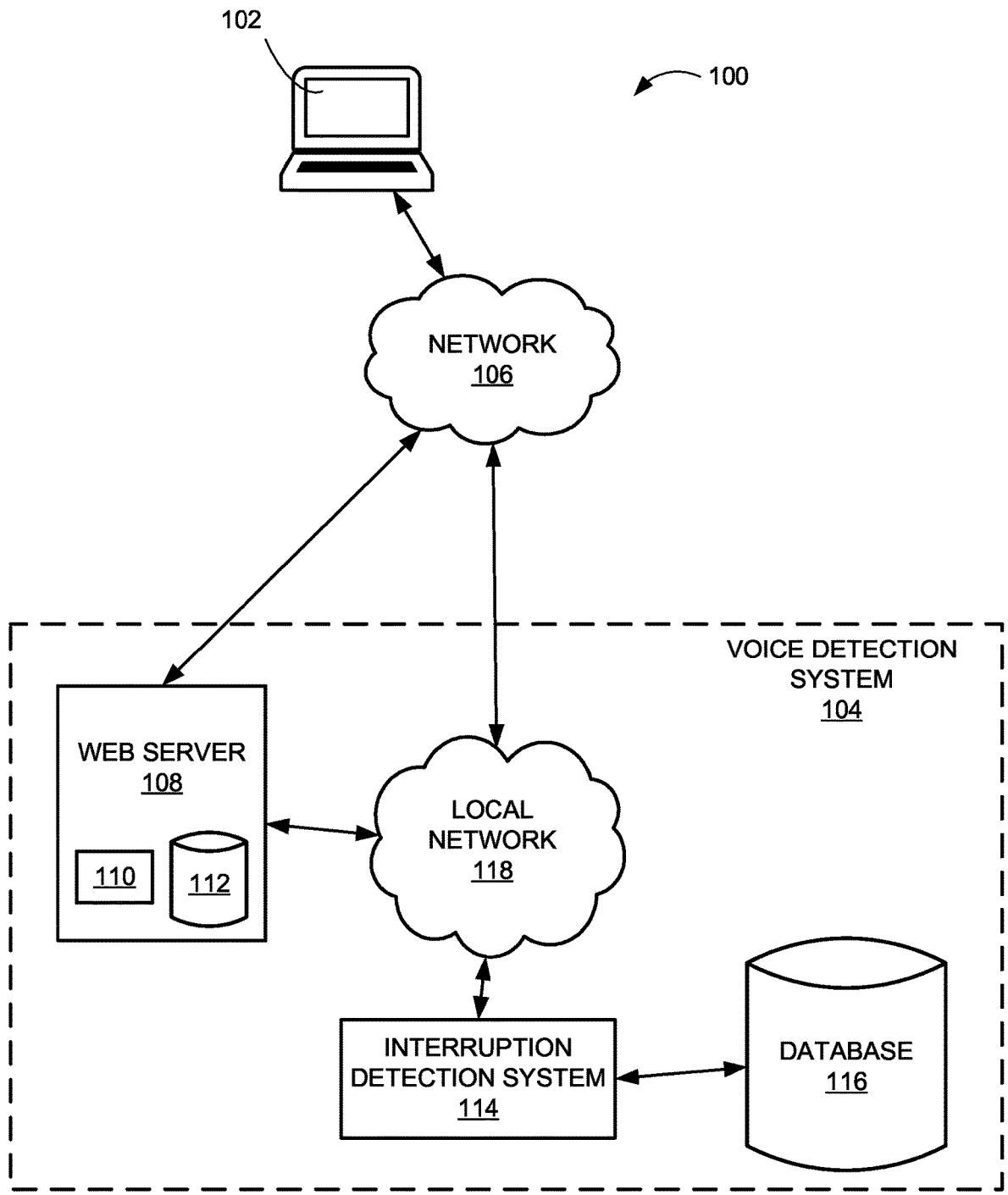
FIG. 1 is a block diagram of an example system that may be used to detect emotion from audio files, according to an example implementation of the disclosed technology.

FIG. 1 is a block diagram of an example system that may be used to identify customer emotion, according to an example implementation of the disclosed technology. The components and arrangements shown in FIG. 1 are not intended to limit the disclosed embodiments as the components used to implement the disclosed processes and features may vary. As shown, voice detection system 104 may interact with a user device 102 via a network 106. In certain example implementations, the voice detection system 104 may include a local network 118, an interruption detection system 114, a web server 108, and a database 116.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the voice detection system 104. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the voice detection system 104. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiF™ ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

Voice detection system 104 may be associated with and optionally controlled by one or more entities such as a business, corporation, individual, partnership, or any other entity that provides one or more of goods, services, and consultations to individuals such as customers. In some embodiments, voice detection system 104 may be controlled by a third party on behalf of another business, corporation, individual, partnership. Voice detection system 104 may include one or more servers and computer systems for performing one or more functions associated with products and/or services that the organization provides.

Web server 108 may include a computer system configured to generate and provide one or more websites accessible to customers, as well as any other individuals involved in access system 100's normal operations. Web server 108 may include a computer system configured to receive communications from user device 102 via for example, a mobile application, a chat program, an instant messaging program, a voice-to-text program, an SMS message, email, or any other type or format of written or electronic communication. Web server 108 may have one or more processors 110 and one or more web server databases 112, which may be any suitable repository of website data. Information stored in web server 108 may be accessed (e.g., retrieved, updated, and added to) via local network 118 and/or network 106 by one or more devices or systems (e.g., interruption detection system 114) of system 100. In some embodiments, web server 108 may host websites or applications that may be accessed by user device 102. For example, web server 108 may host a financial service provider website that a user device may access by providing an attempted login that are authenticated by interruption detection system 114. According to some embodiments, web server 108 may include software tools, similar to those described with respect to user device 102 above, that may allow web server 108 to obtain network identification data from user device 102.

Local network 118 may include any type of computer networking arrangement used to exchange data in a localized area, such as WiFi, Bluetooth™ Ethernet, and other suitable network connections that enable components of voice detection system 104 to interact with one another and to connect to network 106 for interacting with components in the system 100 environment. In some embodiments, local network 118 may include an interface for communicating with or linking to network 106. In other embodiments, certain components of voice detection system 104 may communicate via network 106, without a separate local network 118.

In accordance with certain example implementations of the disclosed technology, voice detection system 104 may include one or more computer systems configured to compile data from a plurality of sources, for example, interruption detection system 114, web server 108, and/or database 116. Interruption detection system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, ATM, and business operations. Database 116 may also serve as a back-up storage device and may contain data and information that is also stored on, for example, database 250, as discussed below with reference to FIG. 2.

Although the preceding description describes various functions of a web server 108, an interruption detection system 114, and a database 116, in some embodiments, some or all of these functions may be carried out by a single computing device or a plurality of computing devices in a (cloud) serverless system.

Figure 2:
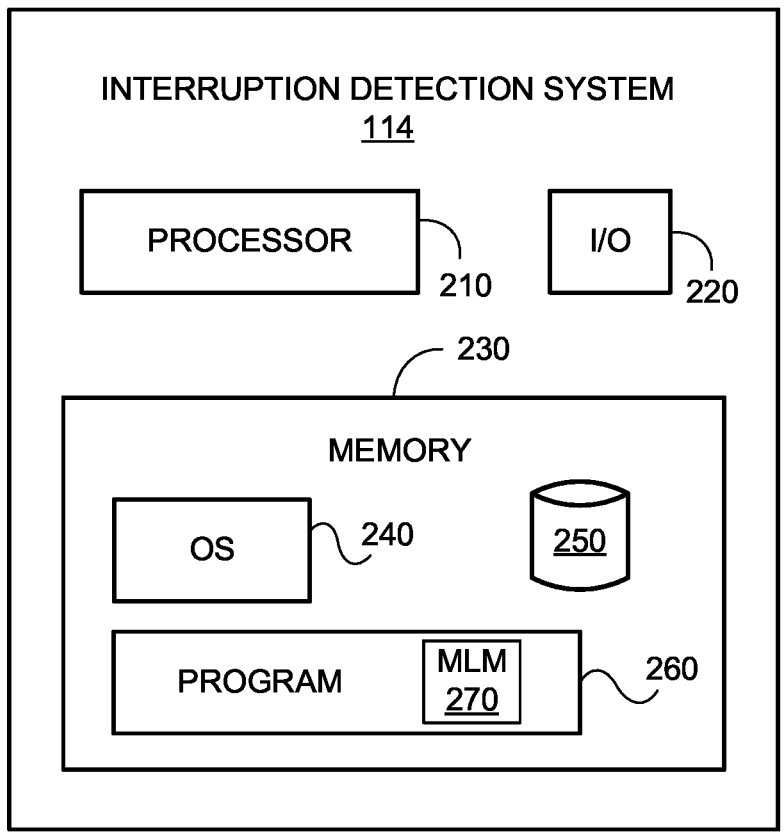
FIG. 2 is a block diagram of an example interruption detection system used to detect emotion from audio files, according to an example implementation of the disclosed technology.

An example embodiment of interruption detection system 114 is shown in more detail in FIG. 2. According to some embodiments, user device 102 and web server 108, as depicted in FIG. 1 and described above, may have a similar structure and components that are similar to those described with respect to interruption detection system 114 shown in FIG. 2. As shown, interruption detection system 114 may include a processor 210, an input/output ("I/O") device 220, a memory 230 containing an operating system ("OS") 240, a database 250, and a program 260. In some embodiments, program 260 may include an MLM 270 that may be trained, for example, to recognize customer emotions based on detected vocal features. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

In certain example implementations, interruption detection system 114 may be a single server or may be configured as a distributed computer system including multiple servers or computers that interoperate to perform one or more of the processes and functionalities associated with the disclosed embodiments. In some embodiments, interruption detection system 114 may be one or more servers from a serverless or scaling server system. In some embodiments, interruption detection system 114 may further include a peripheral interface, a transceiver, a mobile network interface in communication with processor 210, a bus configured to facilitate communication between the various components of interruption detection system 114, and a power source configured to power one or more components of interruption detection system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

In accordance with certain example implementations of the disclosed technology, interruption detection system 114 may include one or more storage devices configured to store information used by processor 210 (or other components) to perform certain functions related to the disclosed embodiments. In one example, interruption detection system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, interruption detection system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, interruption detection system 114 may include memory 230 that may include one or more programs 260 to perform one or more functions of the disclosed embodiments. For example, in some embodiments, interruption detection system 114 may additionally manage dialogue and/or other interactions with the customer via a program 260.

Processor 210 may execute one or more programs located remotely from interruption detection system 114. For example, interruption detection system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 250 for storing related data to enable interruption detection system 114 to perform one or more of the processes and functionalities associated with the disclosed embodiments.

Interruption detection system 114 may also be communicatively connected to one or more memory devices (e.g., databases) locally or through a network. The remote memory devices may be configured to store information and may be accessed and/or managed by interruption detection system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Interruption detection system 114 may also include one or more I/O devices 220 that may comprise one or more interfaces for receiving signals or input from devices and providing signals or output to one or more devices that allow data to be received and/or transmitted by interruption detection system 114. For example, interruption detection system 114 may include interface components, which may provide interfaces to one or more input devices, such as one or more keyboards, mouse devices, touch screens, track pads, trackballs, scroll wheels, digital cameras, microphones, sensors, and the like, that enable interruption detection system 114 to receive data from a user (such as, for example, via user device 102).

In example embodiments of the disclosed technology, interruption detection system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While interruption detection system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of interruption detection system 114 may include a greater or lesser number of components than those illustrated.

FIG. 3 is a flow diagram illustrating an exemplary method 300 for detecting emotion from audio files, in accordance with certain embodiments of the disclosed technology. Method 300 may be performed by one or more components of system 100 (e.g., interruption detection system 114 or web server 108 of voice detection system 104 or user device 102), as described above with respect to FIGS. 1 and 2.

In block 302, the system (e.g., via voice detection system 104) may receive an audio file comprising a first channel and a second channel, the first channel comprising first voice activity of a first user and the second channel comprising second voice activity of a second user. That is, the audio file may comprise a dual-channel audio file. For example, the audio file may comprise an interaction (e.g., a conversation) between a customer and a customer service agent. Utilizing dual-channel or interactive audio files provides a significant advantage, compared to conventional single channel approaches, by being able to analyze changes in speaker by including features related to speaker turn changes (e.g., moments of interruption, as described further below), rather than individual vocal feature values alone.

In block 304, the system (e.g., via interruption detection system 114) may detect one or more moments of interruption between the first and second users from the audio file. That is, the system may detect one or more durations of voice activity on each channel of the audio file in order to find one or more moments of interruption between the first and second users. Detecting the one or more moments may be performed via a trained MLM, such as a NN or DNN, capable of conducting voice activity detection (VAD). The one or more moments of interruption may comprise one or more overtake wait times or overtalking periods, i.e., an amount of overlap between the first and second channels. These overlaps may potentially comprise moments of specific user emotion (e.g., agitation), or merely accidental interruptions (e.g., if one user suddenly remembered an important point or if both speakers coincidentally began speaking at the same time). In some embodiments, the MLM may be trained to separate each detected audio file into one or more portions, and to map each separated portion to one or more phonetic representations. The MLM may also be trained to classify each portion as either a speech portion or a non-speech portion based on each portion's respective one or more phonetic representations (e.g., vowels or consonants). In some embodiments where a DNN is used, the DNN may comprise long short-term memory (LSTM) with attention. In other embodiments, however, any other NN appropriate for end-to-end (E2E) automatic speech recognition (ASR) may be utilized.

In block 306, the system (e.g., via interruption detection system 114) may extract one or more vocal features from the one or more moments of interruption, the one or more vocal features comprising one or more of length of interruption, pre-interruption speaking rate, post-interruption speaking rate, pre-interruption speaking duration, post-interruption speaking duration, voice activity ratio, pre-interruption voice energy, and post-interruption voice energy. The one or more vocal features may also comprise other LLD or HLD features. Extracting the one or more vocal features may also be performed via a trained MLM, such as a NN or DNN. Each of the one or more vocal features may comprise a respective unit of measurement. For example, the length of interruption may be measured in seconds, the pre-interruption and post-interruption speaking rates in number of syllables per second, the pre-interruption and post-interruption speaking durations in seconds, the voice activity ratio in seconds of active speech duration to seconds of pause duration, and the pre-interruption and post-interruption voice energy in decibels. In some embodiments, an MLM may also be trained to extract certain textual features from the audio files, such as specific words predetermined to correspond with certain emotions.

In decision block 308, the system (e.g., via interruption detection system 114) may determine, using an MLM and based on the one or more vocal features, whether a threshold number of moments of the one or more moments of interruption corresponds to a first emotion type. That is, the MLM may be trained by providing the MLM with a training data that includes one or more first vocal features each with one or more labels corresponding to the one or more first vocal features. The one or more labels may correspond to a first emotion type (e.g., agitation), a second emotion type (e.g., non-agitation), or other emotion types (e.g., angry, happy, sad, disappointed, etc.). Based on the training data, the MLM may classify unlabeled data sets such as each of the one or more extracted vocal features. The MLM may comprise any type of model capable of conducting binary classification, such as Logistic Regression, Random Forest, Support Vector Machine (SVM), DNN, etc. An advantage of using a Logistic Regression model specifically is that it requires minimal data for training purposes, e.g., a few hundred cases or about one hour of audio recording. An advantage of using a Random Forest model specifically is that, while it does rely on a larger data set than does a Logistic Regression model, for example, a Random Forest model may provide more accurate results based on its larger data set.

The threshold number of moments may be equal to any number and may be configured such that the system (e.g., via voice detection system 104) may only associate an audio file with a first emotion type, as discussed further below, if the MLM determines that at least that threshold number of moments, out of all moments of interruption detected from the audio file, is associated with the first emotion type. For example, the threshold may be equivalent to one, such that the MLM need only determine that at least one moment, out of all moments of interruption detected from the audio file, corresponds to a first emotion type in order for the system to associate the audio file with the first emotion type. As another example, the threshold may be equivalent to five, such that the MLM must determine at least five moments, out of all moments of interruption detected from the audio file, correspond to a first emotion type in order for the system to associate the audio file with the first emotion type.

In block 310, in response to determining that the threshold number of moments corresponds to the first emotion type, the system (e.g., via voice detection system 104) may transmit a first message comprising a first binary indication. The system may save the one or more portions of the audio file corresponding to the threshold number of moments, and may transmit the first message to, for example, a user device or a queue for purposes of later retrieval and/or review of the saved portion(s). The first binary indication may comprise a "yes" or otherwise positive indication that the threshold number of moments corresponds to the first emotion type. Transmitting the first message may further comprise classifying the audio file as associated with the first emotion type, e.g., user agitation.

In block 312, in response to determining that the threshold number of moments do not correspond to the first emotion type, the system (e.g., via voice detection system 104) may transmit a second message comprising a second binary indication. As described above with respect to the first message, the system may also save the one or more portions of the audio file corresponding to the threshold number of moments, and may transmit the second message to, for example, a user device or a queue for purposes of later retrieval and/or review of the saved portion(s). The second binary indication may comprise a "no" or otherwise negative type indication that the threshold number of moments do not correspond to the first emotion type. Transmitting the second message may further comprise classifying the audio file as associated with a non-moment of the first emotion type, or a second emotion type, e.g., user non-agitation.

Method 400 of FIG. 4 is similar to method 300 of FIG. 3, except that method 400 utilizes a NN to detect the one or more moments of interruption while method 300 utilizes a DNN. The descriptions of blocks 402, 404, 406, 408, 410, and 412 are the same as or similar to the respective descriptions of blocks 302, 304, 306, 308, 310, and 312 of method 300 and as such, are not repeated herein for brevity.

Method 500 of FIG. 5 is also similar to method 300 of FIG. 3, except that method 500 utilizes a MLM to detect the one or more moments of interruption and classifies the audio file as associated with either user agitation or user non-agitation, depending on whether the threshold number of moments was determined to correspond to the first emotion type, while method 300 utilizes a DNN to detect the one or more moments of interruption and transmits messages comprising either a first or second binary indication. The descriptions of blocks 502, 504, 506, 508, 510, and 512 are the same as or similar to the respective descriptions of blocks 302, 304, 306, 308, 310, and 312 of method 300 and as such, are not repeated herein for brevity.

EXAMPLE USE CASE

The following example use case describes an example of a typical user flow pattern. This section is intended solely for explanatory purposes and not in limitation.

In one example, an organization may utilize a system for detecting customer agitation during calls with customer service agents at the organization's call centers. The organization may rely on this system for training customer service agents in how to communicate with customers who may be agitated based on some issue concerning, for example, a product a customer purchased from the organization. The system may be configured to receive a dual-channel audio file containing a recorded conversation between a customer and an agent. Using a trained DNN, the system may detect, for example, five separate moments within the conversation where there is an overlap in the customer and agent's channels, i.e., where the customer interrupted the agent or vice versa. Some of these moments may be moments of agitation on the part of the customer; however, some may simply be unintentional interruptions, e.g., both the customer and agent accidentally speaking at the same time. In order to distinguish which of these moments is in fact a moment of customer agitation, the system, using the DNN, may be configured to extract various vocal features from each of the detected moments of interruption. These features may include length of each interruption, the rate at which the customer and agent were speaking immediately before and after the interruption, the duration of time the customer and agent were speaking immediately before and after the interruption, a voice activity ratio between the customer and agent, and voice energy of the customer and agent immediately before and after the interruption. The system may then utilize a Random Forest model to determine, based on the extracted features, whether at least three of the five separate moments of interruption correspond to user agitation. If at least three moments correspond to user agitation, the system may be configured to transmit a first message to a review queue, wherein the first message indicates the dual-channel audio file may be associated with user agitation. On the other hand, if at least three moments do not correspond to user agitation, the system may also be configured to transmit a second message to the review queue, wherein the second message indicates the dual-channel audio file may be associated with non-user agitation. The review queue may be utilized both for agent training, as well as further model training.

In some examples, disclosed systems or methods may involve one or more of the following clauses:

Clause 1: A system comprising: one or more processors; and memory in communication with the one or more processors and storing instructions that are configured to cause the system to: receive an audio file comprising a first channel and a second channel, the first channel comprising first voice activity of a first user and the second channel comprising second voice activity of a second user; detect, using a deep neural network (DNN), one or more moments of interruption between the first and second users from the audio file; extract, using the DNN, one or more vocal features from the one or more moments of interruption, the one or more vocal features comprising one or more of length of interruption, pre-interruption speaking rate, post-interruption speaking rate, pre-interruption speaking duration, post-interruption speaking duration, voice activity ratio, pre-interruption voice energy, and post-interruption voice energy; determine, using a machine learning model and based on the one or more vocal features, whether a threshold number of moments of the one or more moments of interruption corresponds to a first emotion type; when the threshold number of moments corresponds to the first emotion type, transmit a first message comprising a first binary indication; and when the threshold number of moments does not correspond to the first emotion type, transmit a second message comprising a second binary indication.

Clause 2: The system of clause 1, wherein the DNN comprises long short-term memory (LS™).

Clause 3: The system of clause 1, wherein the instructions are further configured to cause the system to: separate, using the DNN, the audio file into one or more portions; map, using the DNN, each portion of the one or more portions to one or more phonetic representations; and classify, using the DNN, each portion of the one or more portions as either a speech portion or a non-speech portion based on each portion's respective one or more phonetic representations.

Clause 4: The system of clause 3, wherein the one or more phonetic representations comprise one or more of vowels and consonants.

Clause 5: The system of clause 1, wherein the length of interruption comprises seconds, the pre-interruption and post-interruption speaking rates comprise number of syllables per second, the pre-interruption and post-interruption speaking durations comprise seconds, the voice activity ratio comprises active speech duration in seconds to pause duration in seconds, and the pre-interruption and post-interruption voice energy comprise decibels.

Clause 6: The system of clause 1, wherein transmitting the first message further comprises classifying the audio file as associated with user agitation.

Clause 7: The system of clause 1, wherein transmitting the second message further comprises classifying the audio file as associated with user non-agitation.

Clause 8: A system comprising: one or more processors; and memory in communication with the one or more processors and storing instructions that are configured to cause the system to: receive a dual-channel audio file comprising an interaction between a first user and a second user; detect, using a neural network, one or more moments of interruption between the first and second users from the dual-channel audio file; extract, using the neural network, one or more vocal features associated with each of the one or more moments of interruption, the one or more vocal features comprising one or more of length of interruption, speaking rate, speaking duration, voice activity ratio, and voice energy; determine, using a machine learning model and based on the one or more vocal features, whether a threshold number of moments of the one or more moments of interruption corresponds to a first emotion type; when the threshold number of moments corresponds to the first emotion type, transmit a first message comprising a first binary indication; and when the threshold number of moments does not correspond to the first emotion type, transmit a second message comprising a second binary indication.

Clause 9: The system of clause 8, wherein the neural network is a deep neural network (DNN).

Clause 10: The system of clause 9, wherein the DNN comprises long short-term memory (LS™).

Clause 11: The system of clause 10, wherein the instructions are further configured to cause the system to: separate the dual-channel audio file into one or more portions; map each portion of the one or more portions to one or more phonetic representations; and classify each portion of the one or more portions as either a speech portion or a non-speech portion based on each portion's respective one or more phonetic representations, wherein the one or more phonetic representations comprise one or more of vowels and consonants.

Clause 12: The system of clause 8, wherein transmitting the first message further comprises classifying the dual-channel audio file as associated with user agitation.

Clause 13: The system of clause 8, wherein transmitting the second message further comprises classifying the dual-channel audio file as associated with user non-agitation.

Clause 14: A system comprising: one or more processors; and memory in communication with the one or more processors and storing instructions that are configured to cause the system to: receive an audio file comprising an interaction between a first user and a second user; detect, using a first machine learning model, one or more moments of interruption between the first and second users from the audio file; extract, using the first machine learning model, one or more vocal features associated with each of the one or more moments of interruption; determine, using a second machine learning model and based on the one or more vocal features, whether a threshold number of moments of the one or more moments of interruption corresponds to a first emotion type; when the threshold number of moments corresponds to the first emotion type, classify the audio file as associated with user agitation; and when the threshold number of moments does not correspond the first emotion type, classify the audio file as associated with user non-agitation.

Clause 15: The system of clause 14, wherein the first machine learning model comprises a neural network.

Clause 16: The system of clause 14, wherein the first machine learning model comprises a deep neural network (DNN) comprising long short-term memory (LSTM).

Clause 17: The system of clause 14, wherein the audio file comprises a dual-channel audio file.

Clause 18: The system of clause 17, wherein the instructions are further configured to cause the system to: separate, using the first machine learning model, the dual-channel audio file into one or more portions; map each portion of the one or more portions to one or more phonetic representations; and classify each portion of the one or more portions as either a speech portion or a non-speech portion based on each portion's respective one or more phonetic representations.

Clause 19: The system of clause 18, wherein the one or more phonetic representations comprise one or more of vowels and consonants.

Clause 20: The system of clause 14, wherein the one or more vocal features comprise one or more of length of interruption, pre-interruption speaking rate, post-interruption speaking rate, pre-interruption speaking duration, post-interruption speaking duration, voice activity ratio, pre-interruption voice energy, and post-interruption voice energy.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   one or more processors; and
   a memory in communication with the one or more processors and storing instructions that, when executed by the one or more processors, are configured to cause the system to:
   receive an audio file comprising a first channel and a second channel, the first channel comprising first voice activity of a first user and the second channel comprising second voice activity of a second user;
   detect, using a deep neural network (DNN), one or more moments of interruption between the first and second users from the audio file by classifying portions of the audio file as either a speech portion or anon-speech portion based on one or more phonetic representations mapped to each portion of the audio file;
   extract, using the DNN, one or more vocal features from the one or more moments of interruption, the one or more vocal features comprising one or more of pre-interruption speaking rate, post-interruption speaking rate, pre-interruption speaking duration, post-interruption speaking duration, voice activity ratio, or combinations thereof;
   determine, using a machine learning model and based on the one or more vocal features, whether a threshold number of moments of the one or more moments of interruption corresponds to a first emotion type, wherein the machine learning model is trained based on one or more first vocal features comprising one or more labels corresponding to one or more emotion types, and wherein the machine learning model is trained to identify whether each of the one or more moments of interruption correspond to a moment of agitation or a moment of non-agitation;
   when the threshold number of moments corresponds to the first emotion type, transmit a first message comprising a first binary indication; and
   when the threshold number of moments does not correspond to the first emotion type, transmit a second message comprising a second binary indication.

2. The system of claim 1, wherein the DNN comprises long short-term memory (LSTM).

3. The system of claim 1, wherein the instructions are further configured to cause the system to:
   separate, using the DNN, the audio file into one or more portions; and
   map, using the DNN, each portion of the one or more portions to one or more phonetic representations.

4. The system of claim 3, wherein the one or more phonetic representations comprise one or more of vowels and consonants.

5. The system of claim 1, wherein both the pre-interruption and the post-interruption speaking rates are extracted and comprise number of syllables per second, the pre-interruption and post-interruption speaking durations are extracted and comprise seconds, and the voice activity ratio are extracted and comprises active speech duration in seconds to pause duration in seconds.

6. The system of claim 1, wherein transmitting the first message further comprises classifying the audio file as associated with user agitation.

7. The system of claim 1, wherein transmitting the second message further comprises classifying the audio file as associated with user non-agitation.

8. A system comprising:
   one or more processors; and a memory in communication with the one or more processors and storing instructions that, when executed by the one or more processors, are configured to cause the system to:
   receive a dual-channel audio file comprising an interaction between a first user and a second user; detect, using a neural network, one or more moments of interruption between the first and second users from the dual-channel audio file by classifying portions of the dual-channel audio file as either a speech portion or anon-speech portion based on one or more phonetic representations mapped to each portion of the dual-channel audio file, wherein the one or more phonetic representations comprise one or more of vowels and consonants;
   determine whether the one or more moments of interruption exceed a threshold number;
   responsive to the one or more moments of interruption exceeding a threshold number:
      extract, using the neural network, one or more vocal features associated with each of the one or more moments of interruption, the one or more vocal features comprising one or more of speaking rate, speaking duration, and voice activity ratio, or combinations thereof;
      determine, using a machine learning model and based on the one or more vocal features, whether a threshold number of moments of the one or more moments of interruption corresponds to a first emotion type, wherein the machine learning model is trained based on one or more first vocal features comprising one or more labels corresponding to one or more emotion types, and wherein the machine learning model is trained to identify whether each of the one or more moments of interruption correspond to a moment of agitation or a moment of non-agitation;
      when the threshold number of moments corresponds to the first emotion type, transmit a first message comprising a first binary indication; and when the threshold number of moments does not correspond to the first emotion type, transmit a second message comprising a second binary indication.

9. The system of claim 8, wherein the neural network is a deep neural network (DNN).

10. The system of claim 9, wherein the DNN comprises long short-term memory (LSTM).

11. The system of claim 10, wherein the instructions are further configured to cause the system to:
separate the dual-channel audio file into one or more portions; and
map each portion of the one or more portions to one or more phonetic representations.

12. The system of claim 8, wherein transmitting the first message further comprises classifying the dual-channel audio file as associated with user agitation.

13. The system of claim 8, wherein transmitting the second message further comprises classifying the dual-channel audio file as associated with user non-agitation.

14. A system comprising:
one or more processors; and
a memory in communication with the one or more processors and storing instructions that, when executed by the one or more processors, are configured to cause the system to:
receive an audio file comprising an interaction between a first user and a second user;
detect, using a first machine learning model, one or more moments of interruption between the first and second users from the audio file by classifying, using the first machine learning model, portions of the audio file as either a speech portion or a non-speech portion based on one or more phonetic representations mapped to each portion of the audio file;
extract, using the first machine learning model, one or more vocal features associated with each of the one or more moments of interruption, the one or more vocal features comprising one or more of speaking rate, speaking duration, and voice activity ratio, or combinations thereof;
determine, using a second machine learning model and based on the one or more vocal features, whether a threshold number of moments of the one or more moments of interruption corresponds to a first emotion type, wherein the second machine learning model is trained based on one or more first vocal features comprising one or more labels corresponding to one or more emotion types, wherein the threshold number of moments is a predetermined integer associated with a specific emotion type;
when the threshold number of moments corresponds to the first emotion type, classify the audio file as associated with user agitation; and
when the threshold number of moments does not correspond the first emotion type, classify the audio file as associated with user non-agitation.

15. The system of claim 14, wherein the first machine learning model comprises a neural network.

16. The system of claim 14, wherein the first machine learning model comprises a deep neural network (DNN) comprising long short-term memory (LSTM).

17. The system of claim 14, wherein the audio file comprises a dual-channel audio file.

18. The system of claim 17, wherein the instructions are further configured to cause the system to:
separate, using the first machine learning model, the dual-channel audio file into one or more portions; and
map each portion of the one or more portions to one or more phonetic representations.

19. The system of claim 18, wherein the one or more phonetic representations comprise one or more of vowels and consonants.

20. The system of claim 14, wherein the second machine learning model is trained to identify whether each of the one or more moments of interruption correspond to a moment of agitation or a moment of non-agitation.

* * * * *